US012749101B2

(12) United States Patent
Pinkovich et al.

(10) Patent No.: US 12,749,101 B2
(45) Date of Patent: Sep. 29, 2026

(54) ARTIFICIAL INTELLIGENCE POWERED STYLING AGENT

(71) Applicant: Walmart Apollo, LLC, Bentonville, AR (US)

(72) Inventors: Evgeni Pinkovich, Atlit (IL); Gal Sadeh-Kenigsfield, Sderot (IL); Nir Appleboim, Givatayim (IL); Barak Eliyahu Ben Dayan, Haifa (IL); Yotam Michael, Rosh Haayin (IL)

(73) Assignee: WALMART APOLLO, LLC, Bentonville, AR (US)

( * ) Notice: Subject to any disclaimer, the term of this patent is extended or adjusted under 35 U.S.C. 154(b) by 719 days.

(21) Appl. No.: 18/142,402

(22) Filed: May 2, 2023

(65) Prior Publication Data

US 2024/0370914 A1 Nov. 7, 2024

(51) Int. Cl.

*G06V 10/70* (2022.01)
*G06Q 30/0601* (2023.01)
*G06T 11/60* (2006.01)

(52) U.S. Cl.

CPC ......... *G06V 10/70* (2022.01); *G06Q 30/0629* (2013.01); *G06Q 30/0643* (2013.01); *G06T 11/60* (2013.01)

(58) Field of Classification Search

CPC ............... G06V 10/70; G06Q 30/0629; G06Q 30/0643; G06Q 30/0603; G06T 11/60
USPC .......................................................... 382/155
See application file for complete search history.

(56) References Cited

U.S. PATENT DOCUMENTS

| | | | | |
|---|---|---|---|---|
| 10,282,772 | B2 | 5/2019 | Giampaolo et al. | |
| 10,346,893 | B1 | 7/2019 | Duan et al. | |
| 10,872,322 | B2 * | 12/2020 | Siddique | G06Q 20/12 |
| 11,030,782 | B2 * | 6/2021 | Ayush | G06N 3/0455 |
| 11,100,560 | B2 | 8/2021 | Parker et al. | |
| 11,157,988 | B2 | 10/2021 | Penner et al. | |

(Continued)

OTHER PUBLICATIONS

Ravi, A., et al., "Buy Me That Look: An Approach for Recommending Similar Fashion Products," arXiv:2008.11638v2 [cs, CV] Apr. 6, 2021.

(Continued)

*Primary Examiner* — Neil R Mclean
(74) *Attorney, Agent, or Firm* — DICKINSON WRIGHT RLLP; Hector A. Agdeppa

(57) ABSTRACT

A system comprising one or more processors and one or more non-transitory computer-readable media storing computing instructions, that when executed on the one or more processors, cause the one or more processors to perform: receiving stock images comprising an anchor garment; automatically identifying the anchor garment and complementary garments within the stock images; selecting an image of the stock images in which a mask area of a first complementary garment of the complementary garments as a ratio of an area of the anchor garment is largest over other complementary garments of the complementary garments; performing an image search, using the image, in an item catalog for similar garments to the first complementary garment; and displaying, on a user interface, an avatar wearing the anchor garment and at least one of the similar garments. Other embodiments are disclosed.

20 Claims, 15 Drawing Sheets

(56) References Cited

U.S. PATENT DOCUMENTS

| | | | | |
|---|---|---|---|---|
| 2016/0180419 | A1* | 6/2016 | Adeyoola | G06Q 30/0643 705/26.25 |
| 2020/0372560 | A1* | 11/2020 | Dahl | G06N 20/00 |
| 2021/0272295 | A1* | 9/2021 | Ahmadi | G06T 7/207 |

OTHER PUBLICATIONS

Goel, D, et al., "Recommendation of Complementary Garments Using Ontology," IEEE, DOI: 10.1109/NCVPRIPG.2015.7490023, retrieved from https://www.researchgate.net/publication/316877700 Dec. 2015.

Kang, WC., et al., "Complete the Look: Scene-Based Complementary Product Recommendation," arXiv:1812.01748 [cs, CV], https://doi.org/10.48550/arXiv.1812.01748 Dec. 4, 2018.

* cited by examiner

ARTIFICIAL INTELLIGENCE POWERED STYLING AGENT

TECHNICAL FIELD

This disclosure relates generally relates to artificial intelligence powered styling agent.

BACKGROUND

A user can view a selected garment on an avatar using virtual try-on technology, however a recommendation for a complementary garment to complete the outfit can be useful and advantageous to the user.

BRIEF DESCRIPTION OF THE DRAWINGS

To facilitate further description of the embodiments, the following drawings are provided in which.

Figure 1:
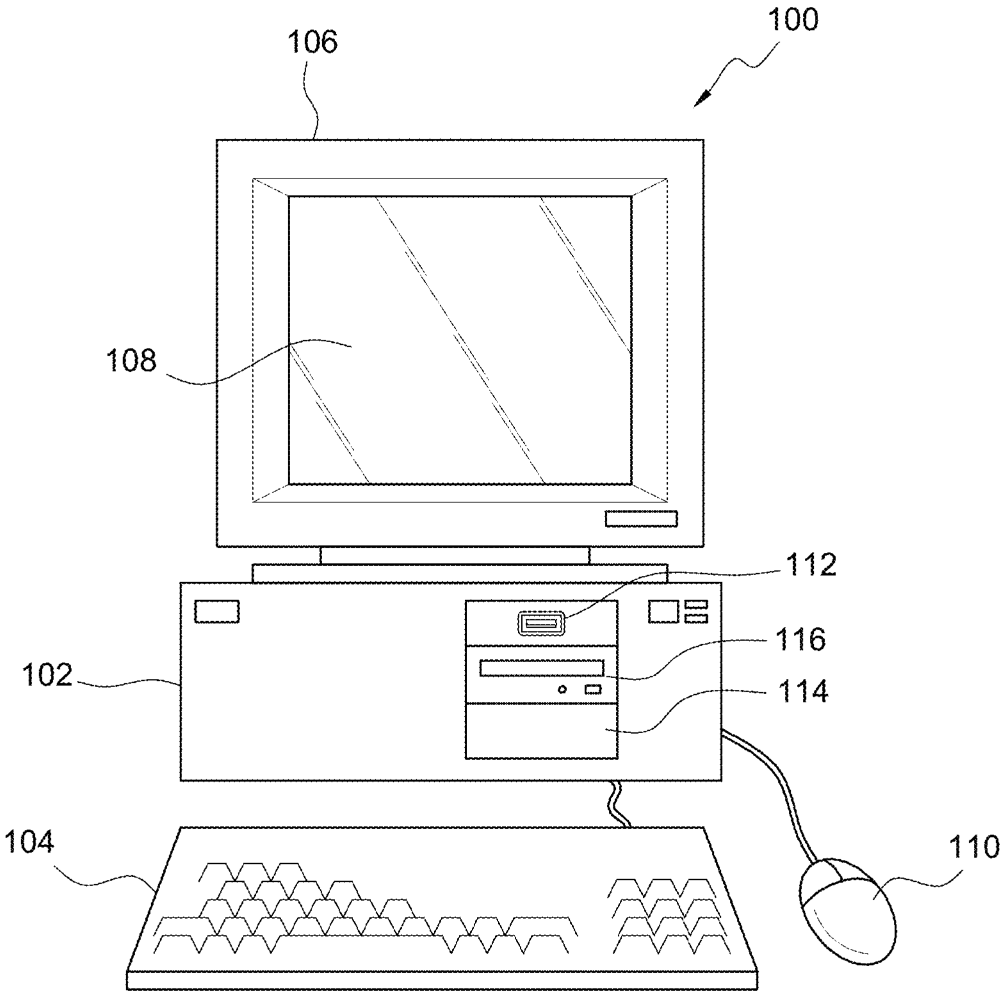
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms “first,” “second,” “third,” “fourth,” and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms “include,” and “have,” and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms “left,” “right,” “front,” “back,” “top,” “bottom,” “over,” “under,” and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms “couple,” “coupled,” “couples,” “coupling,” and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. “Electrical coupling” and the like should be broadly understood and include electrical coupling of all types. The absence of the word “removably,” “removable,” and the like near the word “coupled,” and the like does not mean that the coupling, etc. in question is or is not removable.

As defined herein, two or more elements are “integral” if they are comprised of the same piece of material. As defined herein, two or more elements are “non-integral” if each is comprised of a different piece of material.

As defined herein, “approximately” can, in some embodiments, mean within plus or minus ten percent of the stated value. In other embodiments, “approximately” can mean within plus or minus five percent of the stated value. In further embodiments, “approximately” can mean within plus or minus three percent of the stated value. In yet other embodiments, “approximately” can mean within plus or minus one percent of the stated value.

As defined herein, “real-time” can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term “real-time” encompasses operations that occur in “near” real-time or somewhat delayed from a triggering event. In a number of embodiments, “real-time” can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 milliseconds, 1 second, 2 seconds, or 1 minute, or another suitable time delay period.

DESCRIPTION OF EXAMPLES OF EMBODIMENTS

Figure 2:
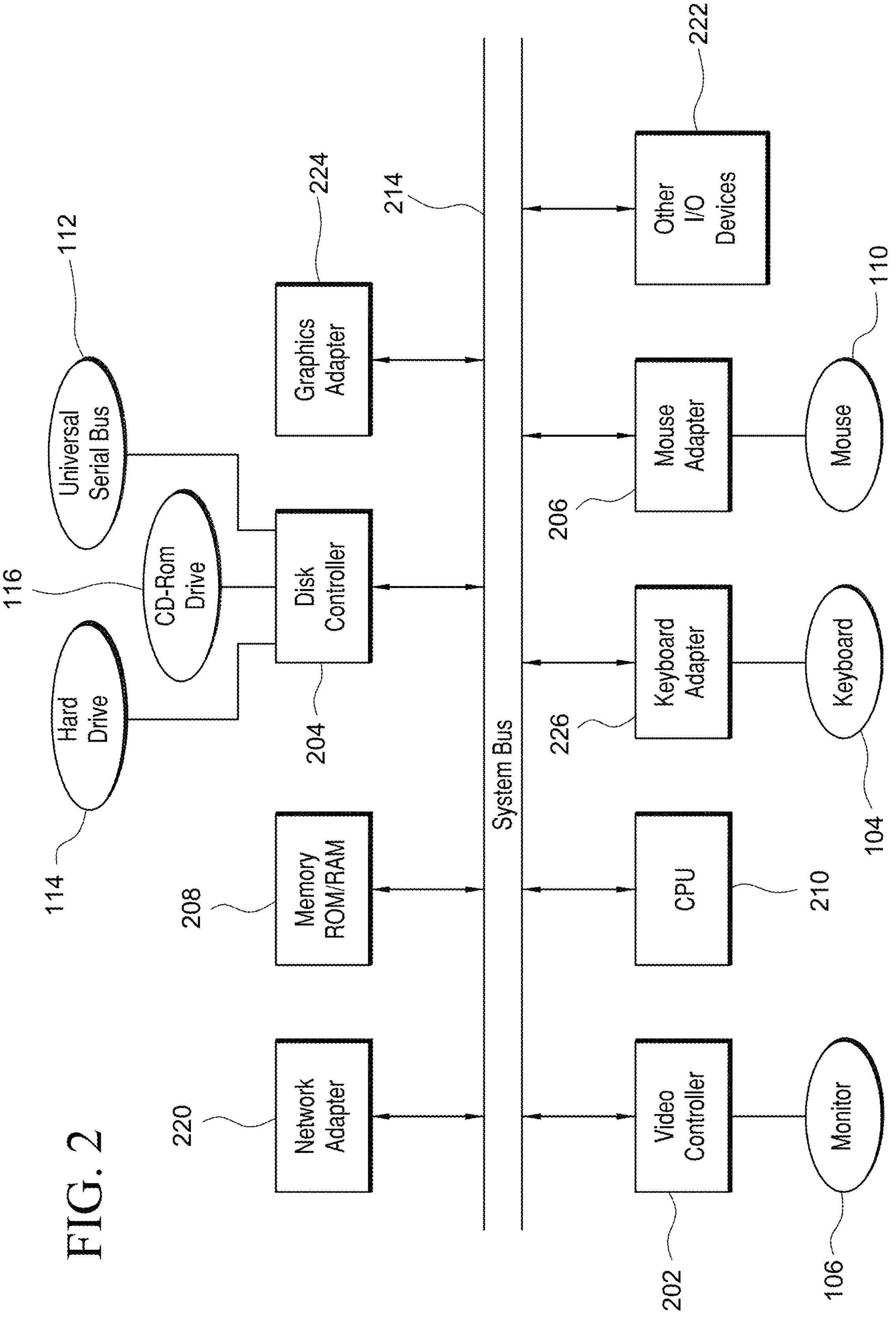
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
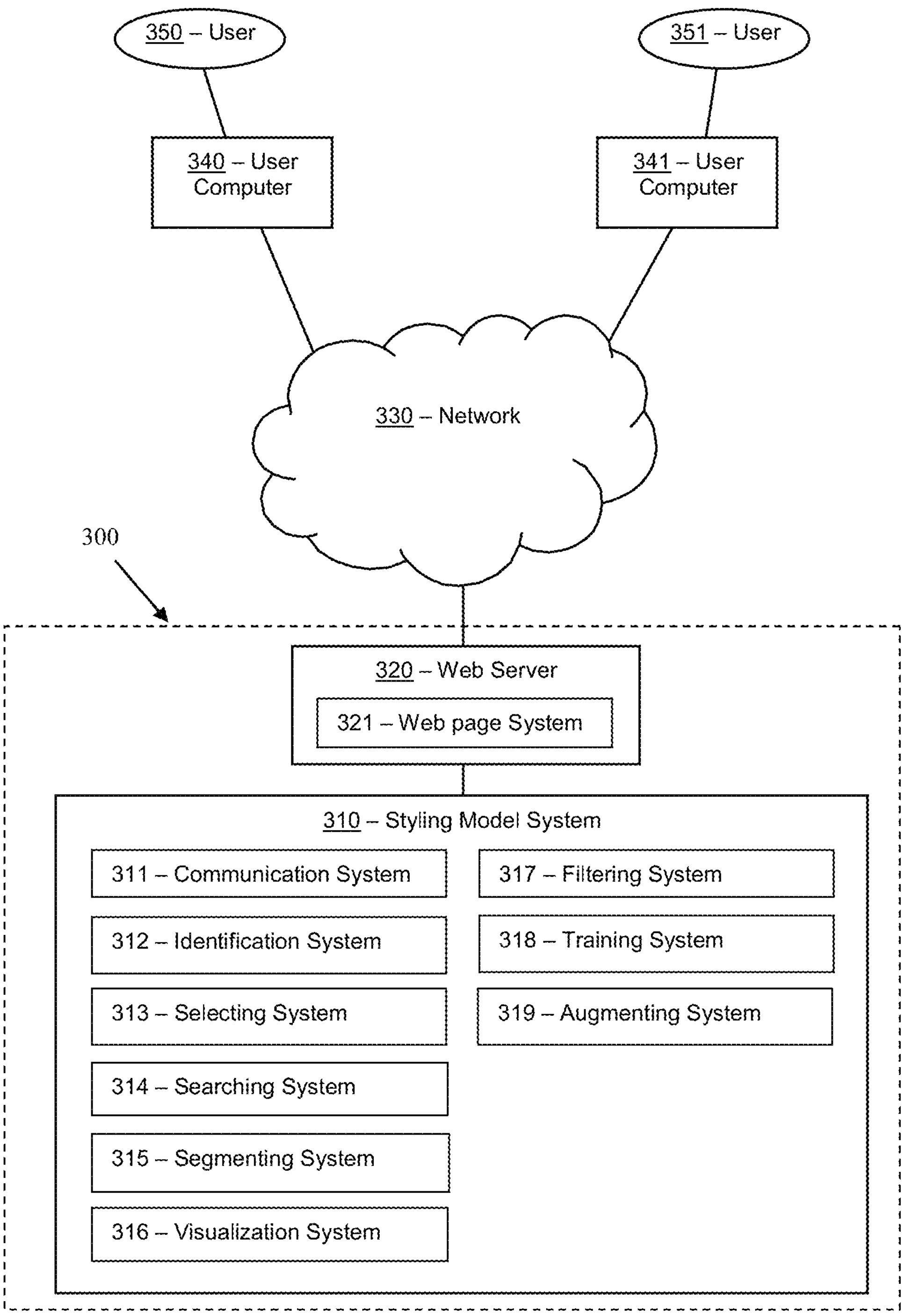
FIG. 3 illustrates a block diagram of a system for recommending complementary garments for an anchor garment to build a complete outfit, according to an embodiment.

Turning ahead in the drawings, FIG. 3 illustrates a block diagram of a system for recommending complementary garments for an anchor garment to build a complete outfit, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a styling model system 310 and/or a web server 320. Styling model system 310 and/or web server 320 can each be a computer system, such as computer system 100 (FIG. 1), as described above, and can each be a single computer, a single server, or a cluster or collection of computers or servers, or a cloud of computers or servers. In an embodiment, a single computer system can host two or more of, or all of, styling model system 310 and/or web server 320. Additional details regarding styling model system 310 and/or web server 320 are described herein.

In a number of embodiments, each of styling model system 310 and/or web server 320 can be a special-purpose computer programed specifically to perform specific functions not associated with a general-purpose computer, as described in greater detail below.

In some embodiments, web server 320 can be in data communication through network 330 with one or more user computers, such as user computers 340 and/or 341. Network 330 can be a public network, a private network or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between styling model system 310 and/or web server 320 within system 300. Accordingly, in some embodiments, styling model system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In several embodiments, system 300 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300. In a similar manner, the processors and/or the non-transitory computer-readable media can be local and/or remote to each other.

Meanwhile, in many embodiments, system 300 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In many embodiments, styling model system 310 can include a communication system 311, an identification system 312, a selecting system 313, a searching system 314, a segmenting system 315, a visualization system 316, a filtering system 317, a training system 318, and/or an augmenting system 319. In many embodiments, the systems of styling model system 310 can be modules of computing instructions (e.g., software modules) stored at non-transitory computer readable media that operate on one or more processors. In other embodiments, the systems of styling model system 310 can be implemented in hardware. Styling model system 310 can be a computer system, such as computer system 100 (FIG. 1), as described above, and can be a single computer, a single server, or a cluster or collection of computers or servers, or a cloud of computers or servers. In another embodiment, a single computer system can host styling model system 310. Additional details regarding styling model system 310 and the components thereof are described herein.

In many embodiments, styling model system 310 can include a framework that mimics the recommendations of a styling agent (SA) when given a garment (e.g., chosen by a user), such as a shirt, the styling agent can then recommend other similar garments that complement the shirt. In several embodiments, the styling agent can utilize two components: a segmentation model and a visual search model (e.g., styling model), as described in greater detail below. In many embodiments, the framework that mimics the recommendation of a styling agent (SA) can be an improvement over conventional recommendation systems that often rely on attempts to try and mimic an acquired preference or taste of a user. In some embodiments, the convention recommendations system often mimic human behavior by encouraging models to mimic subjective tastes or preferences usually learned from examples or data of a user.

Figure 5:
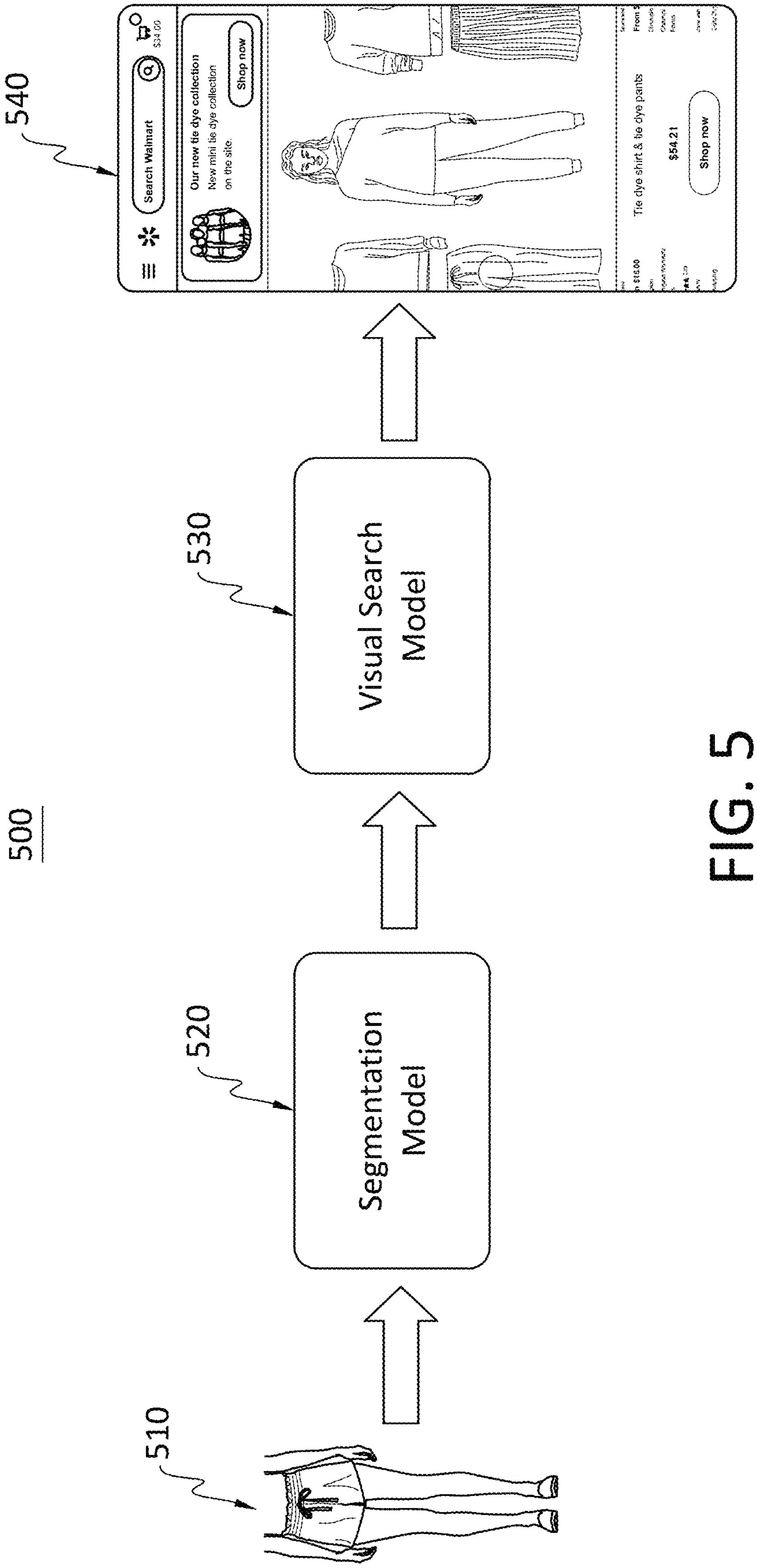
FIG. 5 illustrates a flow chart for a method of creating an avatar modeling a complete outfit based on an anchor garment, according to an embodiment.

Turning ahead in the drawings, FIG. 5 illustrates a flow chart for an overall example of this process, beginning with receiving an image 510 representing an anchor garment from stock images of a vendor. In some cases, image 510 can be selected by a user. In several embodiments, based on image 510, method 500 can use a segmentation model 520 to find a best image of a complementary garment (e.g., complementary to the anchor garment shown in image 510). In some embodiments, the output of segmentation model 520 can include a best image of the candidate garment from among the various stock images that show the candidate garment. In various embodiments, method 500 can include using a visual search model 530 to find similar garments to the complementary garment based on searching an item catalog. In several embodiments, method 500 can output image 540 of displaying an avatar modeling a complete outfit based on one of the similar garments.

In some embodiments, an advantage of using the styling agent framework includes building or generating a visual recommendation system such that, given a garment G, the SA can automatically propose garments that will build a complete outfit without mimicking subjective preferences of the user. In many embodiments, the styling agent framework can begin with garment data collected from stock images of a vendor, where each garment has a set of images $$\{g\}_{i=1}^{N},$$

where the chosen garment can appear dressed on a model or avatar with complementing garments, and where g refers to a garment and N refers to the number of images i in the set of images, where the number of images in this set equals one. In various embodiments, using the SA can be subdivided into two sub-tasks: (1) finding the complementing garments in $g_i$, and (2) finding the most similar garments to the anchor (e.g., primary) garment among other garments in a catalog. In several embodiments, a sub-task can be a semantic segmentation task, where the classes are garment classes e.g., shirts, bottoms, jackets, skirts, etc. In some embodiments, the sub-task searches from complementary garments from the vendor in order to find the best image of a complementary garment upon which to base a visualization search.

In many embodiments, the sub-task can define a score where the complementing garments are most visible and apply the score to choose the best image out of the remaining images. In several embodiments, SA can generate a respective score for each complementing garment by scanning the image using a scanner, to identify a presence of the anchor item (e.g., main item) in the image, where a higher score correlates to a higher percentage of the anchor item that appears in the scanned image and a lower score correlates to a lower percentage of the anchor item viewed in that appears in the image, such as a partial view of the anchor image. In some embodiments, once the image is scanned, the SA analyzes a ratio of an area of the complementary item compared to an area of the anchor items where a higher ratio correlates to a higher score such as a ratio between 1.0 and 0.0. For example, a higher ratio of 1.0 indicates that the image of the complementing garment is most visible and the score can be applied to choose the best image out of the remaining images. In many embodiments, a scanned image can show a location of a complementary garment that is cropped where the ratio of the area will be lower thus reducing the score for that scanned image. In some embodiments, when the location of the complementary item in the scanned image touches the image boundaries, the SA determines that the image can be cropped to some percentage when finding the ratio of that image.

In various embodiments, the next sub-task can apply a visual search algorithm that completes the SA system. In a number of embodiments, a visual search model can utilize self-supervised techniques that can capture similarity in a representation space, and where the recommendations are based on K-nearest neighbors in the representation space. In various embodiments, SA can output recommendations based on similarity in the representation space and implement a three-step approach that gradually integrates auxiliary information into a training procedure such as categorical garment features (collar type, sleeve length, etc.), while also integrating feedback by individuals or experts, such as fashion expert recommendations.

Figure 4:
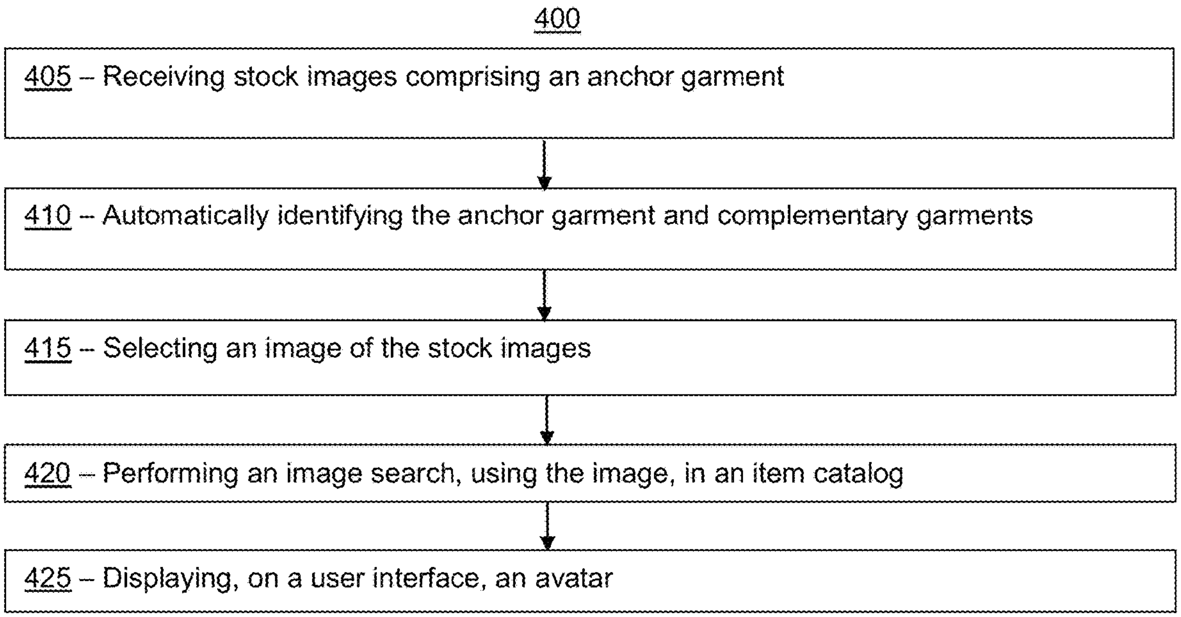
FIG. 4 illustrates a flow chart for a method of building a complete outfit in a virtual space based on an anchor garment and complementary garments, according to an embodiment.

Turning back in the drawings, FIG. 4 illustrates a flow chart for a method 400, according to an embodiment. In some embodiments, method 400 can be a method of building a complete outfit in a virtual space based on an anchor garment and complementary garments, according to an embodiment. In various embodiments, the complete outfit can be modeled by an avatar in the virtual space. In several embodiments, the selected anchor garment can be selected by the user and the complementary garments in other images with the anchor garment can be determined, from which similar images can be selected from garments in a catalog, according to another embodiment. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as styling model system 310 and/or web server 320. The processor(s) can be similar or identical to the processor(s) described above with respect to computer system 100 (FIG. 1).

Figure 6:
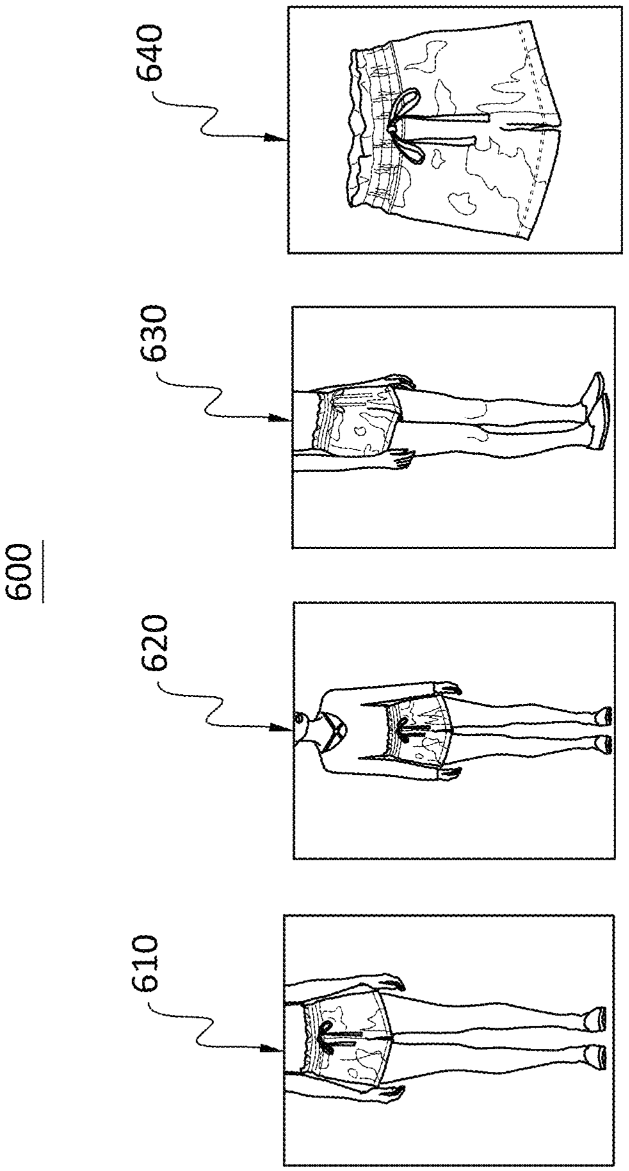
FIG. 6 illustrates examples of stock images, which can include the anchor garment and, in many cases, complementary garments.

In a number of embodiments, method 400 can include an activity 405 of receiving stock images comprising an anchor garment. In many embodiments, the anchor garment (e.g., a primary garment) can be part of a set of images used for dressing. In some embodiments, the stock images of the anchor garment can be from a vendor catalog. In various embodiments, the anchor garment can be utilized as a basis used by a styling agent to recommend other garments similar to a complementary garment from a catalog inspired by similarity of visual features and/or initial styling by the styling agent. In some embodiments, the recommendations can be based on a premise that each garment (e.g., item or product) has potential matching garments from one of multiple images in a catalog. In some embodiments, the stock images of the anchor garment can be from a vendor catalog. FIG. 6 illustrates examples of stock images, which can include the anchor garment and, in many cases, complementary garments. In the example shown in FIG. 6, image 610 is a primary image (which includes the anchor garment and a complementary garment) selected by a user from stock images of a vendor catalog, and images 620-640 are be alternative (additional) images of the anchor garment and, in some cases, complementary garments, which can be used as data for the segmentation model.

In various embodiments, method 400 also can include an activity 410 of automatically identifying the anchor garment and complementary garments within the stock images. In several embodiments, activity 410 can include using a segmentation model to identify the anchor garment and the complementary garments within the stock images. In some embodiments, the segmentation also can be a semantic segmentation model. In various embodiments, semantic segmentation can include a per-pixel multi-class classification task. In several embodiments, a training example can include a tuple {x, y} where $x \in R^{3\times N\times N}$, is an RGB (Red Green Blue) image, and $y \in R^{C\times N\times N}$ where C is the number of classes, R is a real number and each channel is a binary map representing where the class exists in the image. In some embodiments, an encoder model can be used to for semantic segmentation, such an encoder model can include an Encoder-Decoder Convolutional Neural Network (CNN) architecture or a Feature Pyramid Network (FPN) with an Efficient Net.

In many embodiments, the system can begin by generating training data to train a segmentation model to output (e.g., extract) potential complementing garments. In several embodiments, the segmentation model can be a deep neural network model.

In a number of embodiments, the segmentation model can be trained on two types of image data (e.g., training data) over a period of time: (1) garment images, and (2) synthetic dressings. In many embodiments, garment images can include an image of a single garment on a white background, while synthetic dressing images can include a model or avatar dressed with a single garment or more.

In several embodiments, augmenting the synthetic dressings to make the images more similar to the group of stock images $$\{g_i\}_{i=1}^{N}$$

that can be used to conduct a search for similar garments (as described below in activity 420), wherein $g_i$ refers to group of stock images, N refers to the number of stock images, and i refers to the image and the search for similar garments can include search stock images from a vendor. In various embodiments, the segmentation model can utilize a loss function, such as a cross entropy loss function, to further train the segmentation model, as follows:

$$L = y\log(\hat{y}) \tag{1}$$

Where ŷ refers to the model's prediction, and L is the cross entropy loss function.

Figure 13:
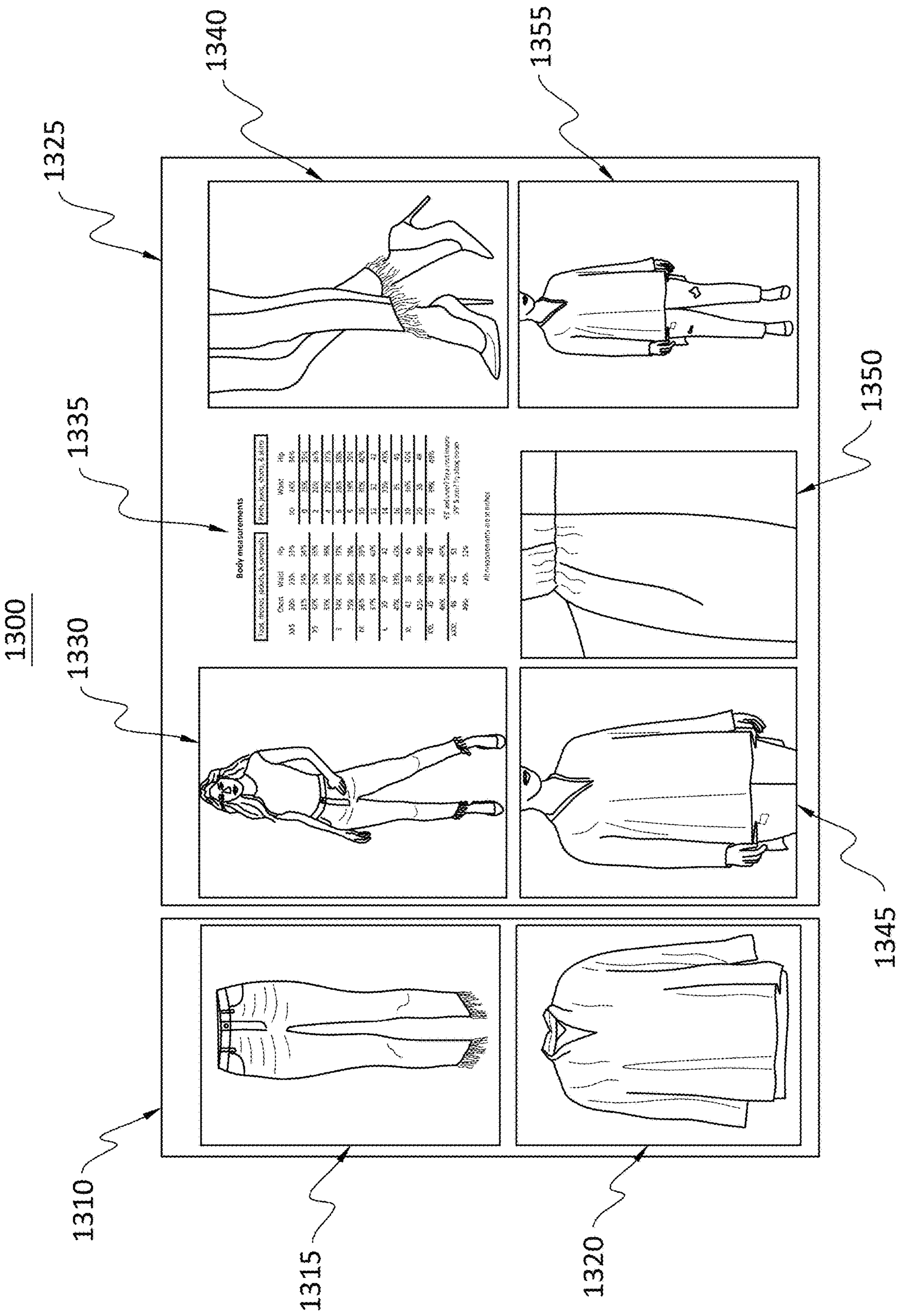
FIG. 13 illustrates example images of visualization data.

Jumping ahead in the drawings, FIG. 13 illustrates example images 1300 of visualization data. Training images 1310 can include images 1315 and 1320. Catalog images 1325 can include images, such as images 1330, 1335, 1340, 1345, 1350, and 1355 used to train the segmentation model to identify complementary garments to the anchor garment in a catalog.

In some embodiments, activity 410 also can include identifying the anchor garment based on which garment is most commonly found in the stock images.

In a number of embodiments, method 400 further can include an activity 415 of selecting an image of the stock images in which a mask area of a first complementary garment of the complementary garments as a ratio of an area of the anchor garment is largest over other complementary garments of the complementary garments. For example, the ratio R is between the area A of the main garment ($g_m$), $A(g_m)$, and the sum of all other completing garment, $$\sum_{i=1}^{N} A(g_i),$$

or $$R = \frac{\sum_{i=1}^{N} A(gi)}{A(g_m)}.$$

In some embodiments, the ratio can be sufficient for in-distribution images of garments (e.g., examples), however test data also can include out-of-distribution (OOD) images of garments (e.g., examples). Further constraints can be added to account for the OOD images. As an example, ODD images can include image 1355 (FIG. 13) which is an image of a black garment and image 1355 (FIG. 13) which is an image of a size chart. These images are OOD images compared to the other garments that are in-distribution as they do not contain information that can be used to infer or find a complementary garment, such as in-distribution images 1330, 1340, 1345, and 1355. In several embodiments, OOD examples can include size charts and fabric images. In some embodiments, filtering out the OOD images can exclude them during a training process and/or skipping them during the inference or activating search process. In various embodiment, the OOD examples can include adding additional constraints, such as, $R<5\cdot A(g_m)$, and the number of connected components, CC<# of garments+2, where R refers to a ratio. In several embodiments, an advantage of adding the constraints to the ratio for OOD examples can include avoiding identifying segments in the images that are not continuous which implies viewing many more smaller segments of the images, thus increasing the number of CC that can lead to more images of the anchor garment that other than a best image. As an example, if the segmentation model recognizes fabric images that are mostly shirts and bottoms, the number of these types of segments can become unnecessarily large diluting the ratio to select the best image. If these type of segments in these images also are not continuous, then this can imply that the group of images can include many more smaller segments hence a large number of CC can over the # of garments that can be used to select the best anchor image.

In many embodiments, activity 415 of selecting the image also can include filtering out the stock images in which the complementary garments are partially cropped out.

Figure 7:
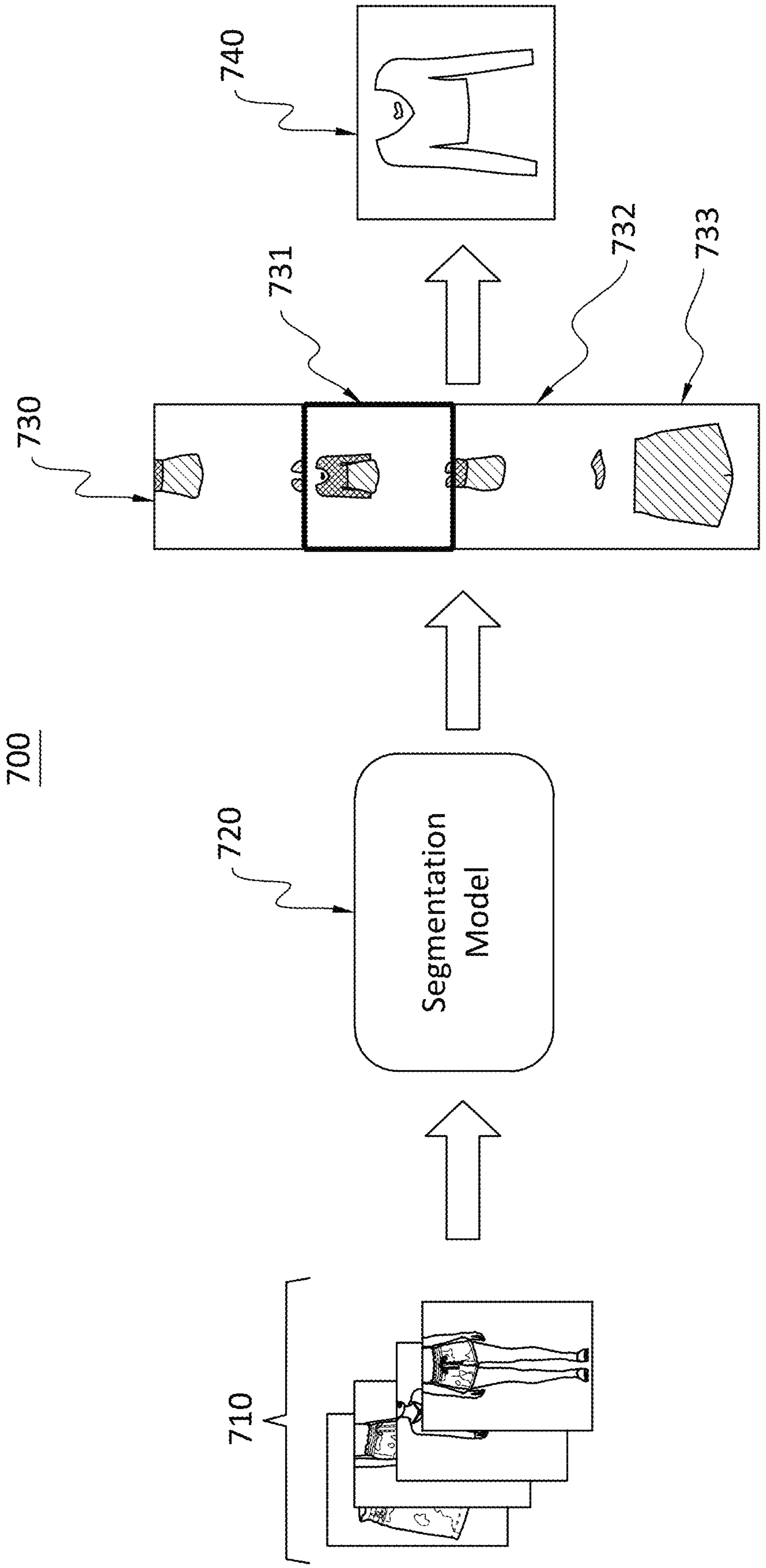
FIG. 7 illustrates a flow chart for an exemplary method of identifying complementary garments and selecting a best image of an anchor garment to create a mask area of the garment.

For example, FIG. 7 illustrates a flow chart for an example of a method 700 of identifying complementary garments and selecting a best image of a complementary garment to an anchor garment to create a mask area of the garment. In many embodiments, method 700 can begin with collecting a set of images 710 of an anchor garment and complementary garments using stock images of a vendor as input for a segmentation model 720 to identify the complementary garments, which are shown in output set of images 730. In some embodiments, method 700 also can include choosing a best image of the output set of images 730 from segmentation model 720. For example, the best image can be selected as described above. In many embodiments, method 700 can include creating a mask area 740 of the anchor image for use in the visual search model to search for complementary images in a catalog.

Figure 8:
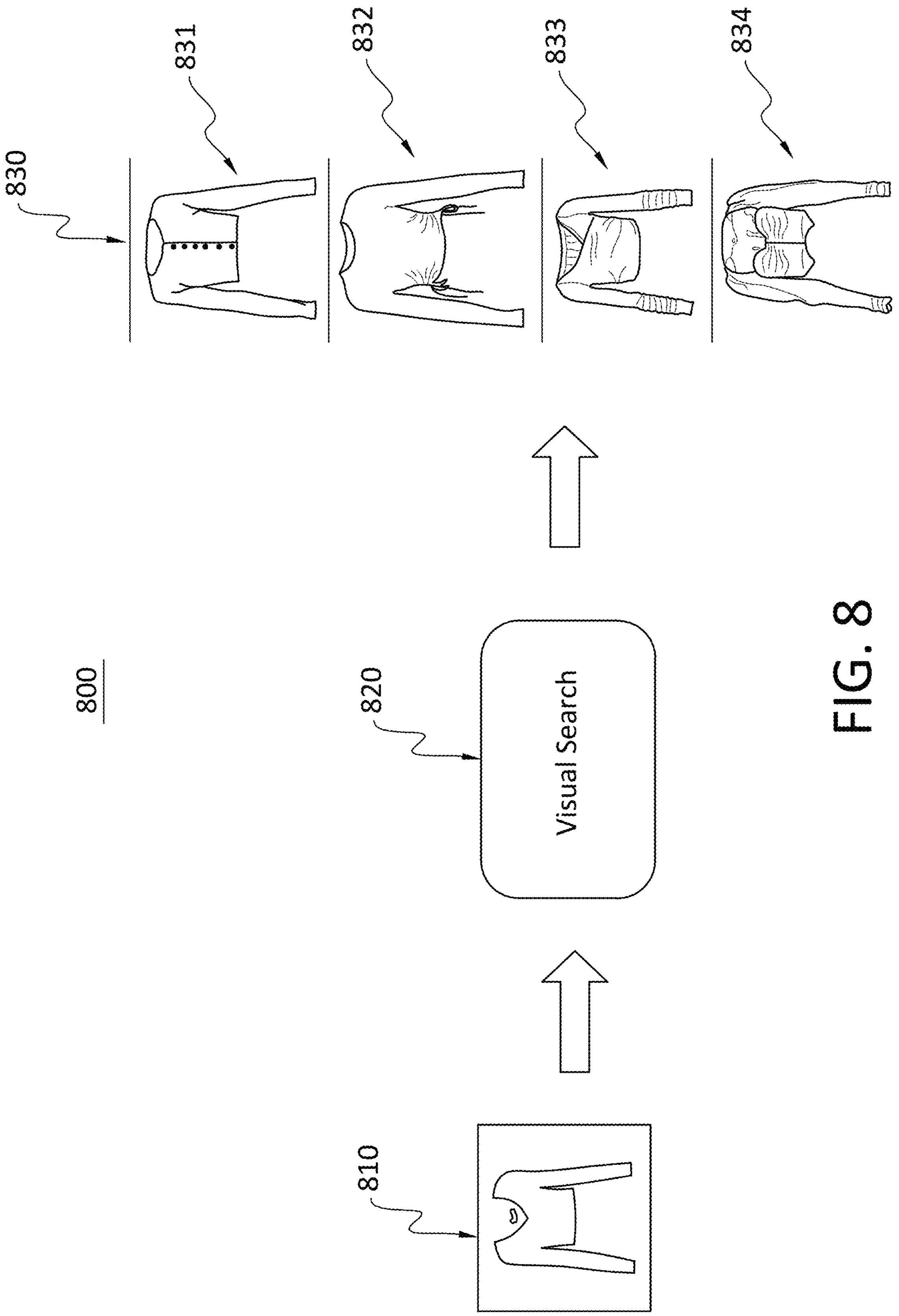
FIG. 8 illustrates a flow chart for an exemplary method of finding similar items to the complementary item.

Returning to FIG. 4, in various embodiments, method 400 also can include an activity 420 of performing an image search, using the image, in an item catalog for similar garments to the first complementary garment. For example, turning ahead in the drawings, FIG. 8 illustrates a flow chart for an example of a method 800 of finding similar items to the complementary item. In some embodiments, method 800 can begin with receiving image 810 of a mask area of the complementary garment. Image 810 can be input into an activity 820 of performing an image search to find images 830 that include garments from the vendor catalog that are similar to the complementary garment in image 810. Images 830 (e.g., 831-834) can include multiple similar garments from the vendor catalog.

In some embodiments, activity 420 can include pre-training a visual search model. In various embodiments, pre-training the visual search model can include a multiple level process: self-supervised pre-training, deep clustering, and an imitation learning.

Figure 9:
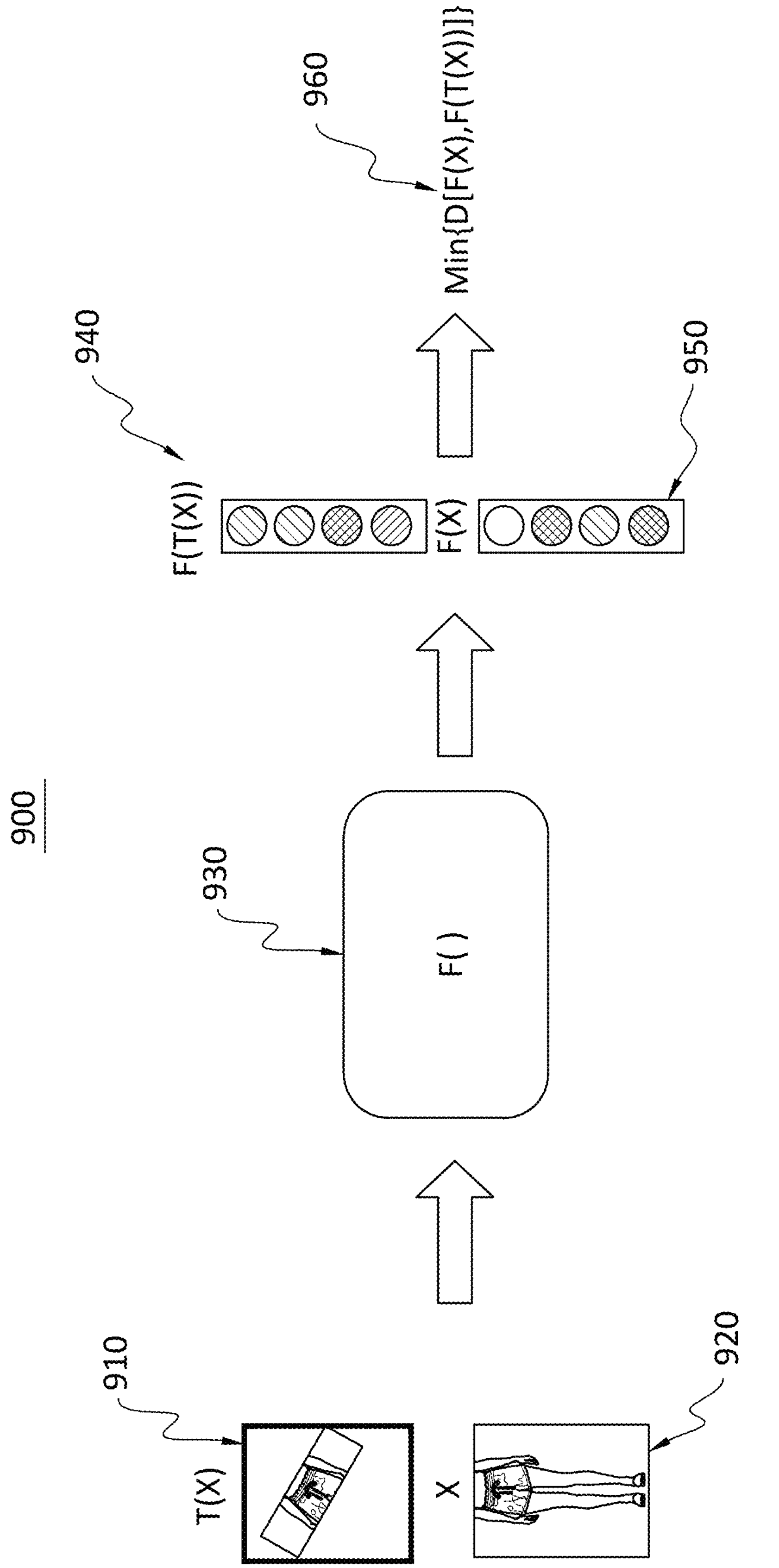
FIG. 9 illustrates an exemplary flow chart for a method of implementing self-supervised learning, according to an embodiment.

Jumping ahead in the drawings, FIG. 9 illustrates an exemplary flow chart of a method 900 of implementing self-supervised learning, according to an embodiment. In some embodiments, method 900 can include obtaining an image 910 and a transformation 920 of image 910. Image 910 and transformation 920 each can be input into a function 930 to generate respective latent representations 950 and 940, respectively. Method 900 also can include an activity 960 of minimizing a distance between these respective latent representations 940 and 950. In many embodiments, activity 960 can be expressed as: Min {D[F(X),F(T(X)))]}, where X is an original image of a garment, T(X) is a transformation image X that preserves its identify, (e.g., translation, rotation, cropping, noise, small changes in color, etc.), F is an operator which calculates the embedding image information into the representation space, F(X) is an embedding vector of the transformed image, D[F(X), F(T(X)))] is a distance between the embedding vectors of X and T(X), and Min{D [F(X), F(T(X))]} refers to training the operator F so that the distance between the embedding of X and T(X) becomes minimized (reduced). In some embodiments, the input data used in self-supervised learning can be transformed into embedding vectors using trainable weights. In several embodiments, input data can include examples of images (e.g., pairs or K-group images) converted to embedding vectors by calculating a derivative of the trainable weights for each image and modifying the weights to account for a lower loss value. In various embodiments, converting the embedding vectors for each respective image cannot be performed manually or calculated in the human mind.

For example, for each garment, g, selected in previous analyses described as a candidate garment for outfit completion, the visual search model can output a latent representation $v_g$ of each candidate garment, such that, $v_g=Ø(g)$, where Ø symbolizes the model, and the candidate garment as a complementary garment is expressed as:

$$\hat{g} = \text{argmin}_i\{d(\phi(g), \phi(g_i)\}, \tag{2}$$

where d is the cosine distance, $g_i$ refers to a garment from a catalog (e.g., styling catalog), and ĝ refers to the garment chosen from the catalog.

In various embodiments, training the visual search model can include implementing a training procedure for pre-training on a self-supervised task, deep clustering, and integrating fashion experts recommendations, as described in greater detail below. In many embodiments, the pre-training step for the self-supervised tasks can include for each example X, the self-supervised task creates (e.g., define) a transformation T, where an objective is to minimize a distance between the example and the transformed example, such that:

$$L_{ssl} = \min(d(\phi(X), \phi(T[X]))) \tag{3}$$

where X is the original image or a garment from a database, T[X] is a transformation of image X that preserves its identity, for example: translation, rotation, cropping, noise, small changes in color, etc., d is the distance, min is the minimization function, and $L_{ssl}$ is the loss function.

In some embodiments, activity 420 further can include pre-training the visual search model by augmenting batch images for training the visual search model with positive examples or negative examples. In several embodiments, augmenting batch images for use as data (training data) to train the visual search model allows the SA to learn from representations of garments that are invariant to a wide range of augmentations.

Figure 14:
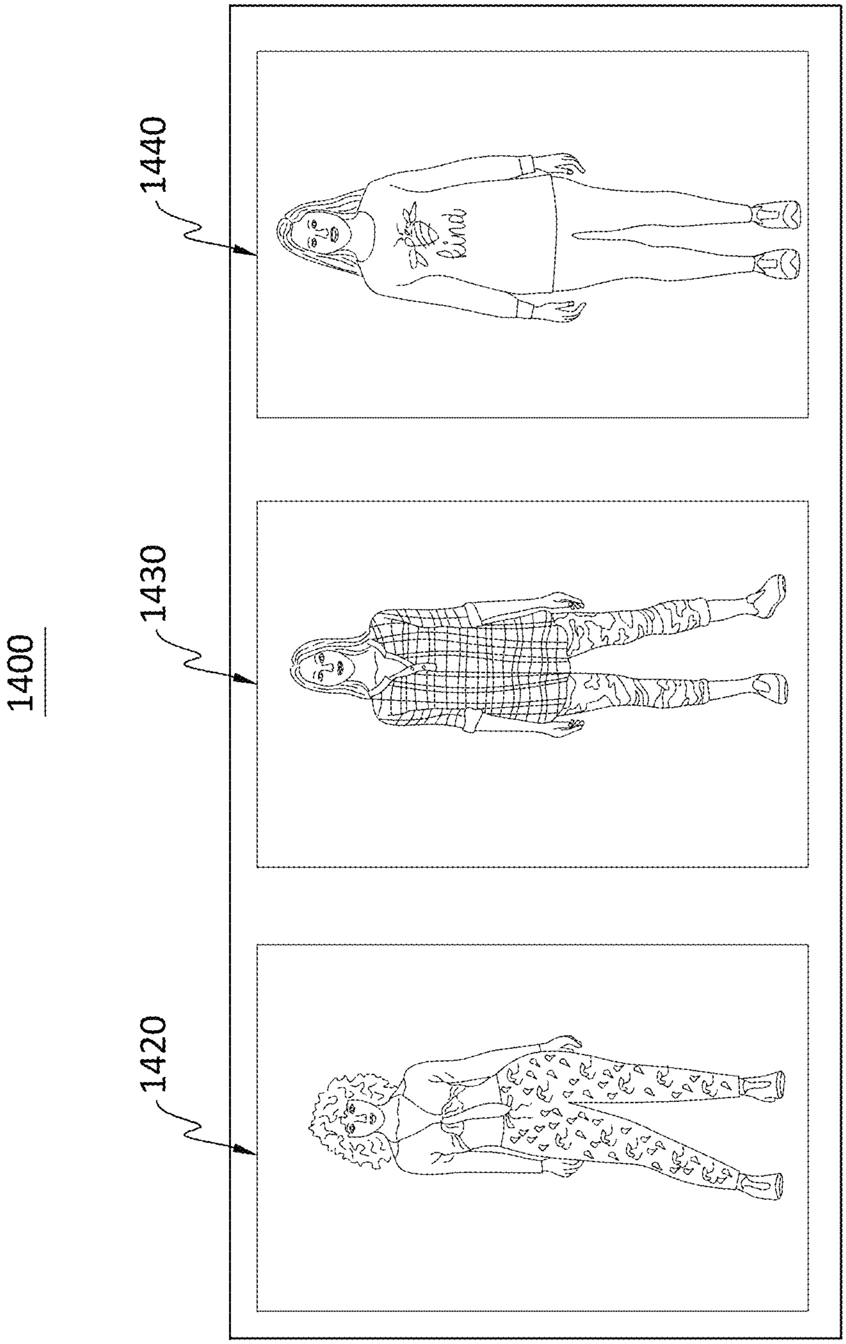
FIG. 14 illustrates example images of augmentations of complementary garment images.

Jumping ahead in the drawings, FIG. 14 illustrates example images 1400 of augmentations of complementary garment images. In some embodiments, images 1400 can include images 1420, 1430, and 1440, which can be created from the images of candidate complementary garments shown in FIG. 13.

In various embodiments, activity 420 of augmenting batch images can include generating new images to be the positive examples, based on the stock images that comprise the first complementary garment, by at least one of the following: changing hues of the first complementary garment, changing an angle of or skewing the first complementary garment, changing a size of the first complementary garment, adding holes in the stock images of the first complementary garment, or changing an avatar model wearing the first complementary garment using a virtual try on (VTO) mode.

In several embodiments, augmenting the batch images additionally can include automatically selecting the negative examples from images of other garments in the item catalog.

In various embodiments, augmenting the batch images also can include generating new images to be the negative examples, based on the stock images that comprise the first complementary garment, by changing a color of the first complementary garment.

In various embodiments, activity 420 further can include performing deep clustering on the visual search model, as pre-trained, to mine k-nearest neighbors, with hard negative mining based on garment metadata. In many embodiments, deep clustering and imitation learning can utilize garment features and enlist individuals (e.g., styling experts) to construct a latent space where garments that have similar features, e.g. neck collar, fit, sleeve length, are similar to each other. In some embodiments, the output of deep clustering and imitation learning can be used as a basis for recommendations on similarity of the complementary garments within the latent space. In many embodiments, the SA uses imitation learning to determine a quality metric of the recommendations.

Figure 10:
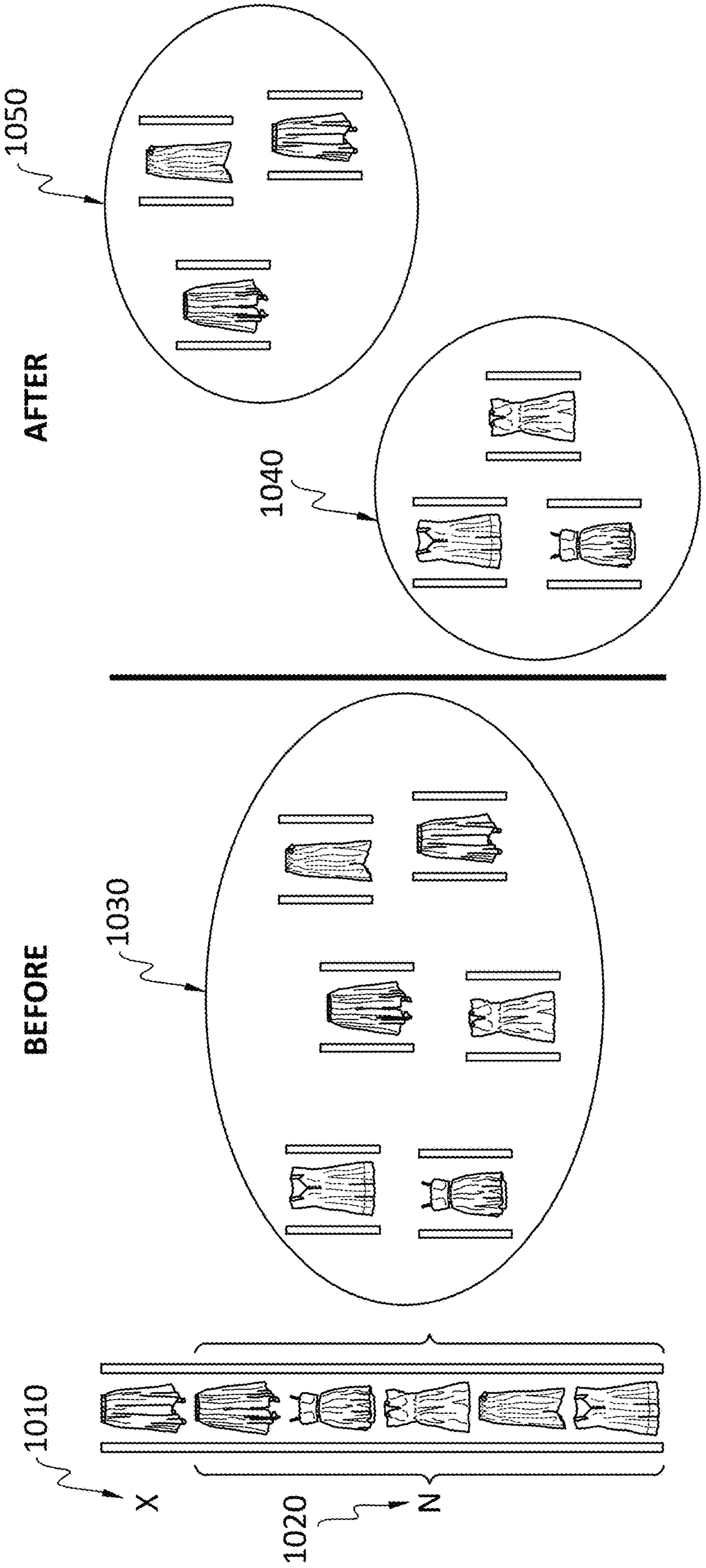
FIG. 10 illustrates an example of deep clustering using hard negative mining with garment metadata.

Turning ahead in the drawings, FIG. 10 illustrates an example of deep clustering using hard negative mining with garment metadata. Image 1010 represents an anchor image (X) from which N images 1020 are mined that are somewhat similar images to X using K-Nearest Neighbors (K-NN). Images 1030 represent the X and N images after the mining for K-NN. Images 1030 can be input into the deep clustering with hard negative mining based on metadata to output clusters 1040 and 1050. Cluster 1050 includes the anchor image X and two other images of garments that are found to be similar from the deep clustering with hard negative mining. Cluster 1040 includes three images of garments that are determined to not be similar enough to anchor image X.

In various embodiments, training a deep clustering algorithm can use the representations (e.g., training data) from the pre-training the visual search, where given a dataset, $D=\{x_1, x_2, \ldots, x_n\}$ for each example $x_i$, we mine its K-NN, $Nx_i$, where N refers to a number of neighbors. In some embodiments, training a deep clustering algorithm can include using a SCAN algorithm. In several embodiments, during training, the SA can maximize the inner product between $x_i$ and all the examples in $Nx_i$ to create an embedding for similar products to get similar embedding. In some embodiments, the input data used deep clustering algorithm can be transformed into embedding vectors using trainable weights. In several embodiments, input data can include examples of images (e.g., pairs or K-group images) converted to embedding vectors by calculating a derivative of the trainable weights for each image and modifying the weights to account for a lower loss value. In various embodiments, converting the embedding vectors for each respective image cannot be performed manually or calculated in the human mind.

In several embodiments, to prevent the deep clustering algorithm from collapsing into one cluster, the SA can maximize the entropy of the cluster's centroids, where a final loss is expressed as:

$$L_{SCAN=}-\sum_{i=1}^{N}\sum_{\kappa\in Nx_i}\log(\langle\phi(x_i),\phi(k)\rangle)+\sum_{i=1}^{C}\phi'_c\log(\phi'_c), \tag{4}$$

where Ø is the model, Ø'c is the centroid of the c'th cluster, N refers to a number of nearest neighbors, k is an index, i is an index, and $L_{scan}$ is the loss function. In several embodiments, the final loss can be minimized during training (e.g., optimization).

In several embodiments, deep clustering can capture additional garment properties, such as sleeve length, type of collar, fit, etc., by utilizing meta-data collected and stored in a data base the meta-data contains information of multiple properties regarding the garments. In some embodiments, for each garment, a properties vector $P=[p_1, p_2 \ldots, p]$ can be constructed then utilized in the following manner:

$$L_{meta=}-\sum_{i=1}^{N}\sum_{k\in Nx_i}\operatorname{sign}(\langle P_{x_i}, P_k\rangle)\cdot\log(\langle\phi(x_i),\phi(k)\rangle)+\sum_{i=1}^{C}\phi'_c\log(\phi'_c), \tag{5}$$

Where $P_{x_i}$ refers to properties of $x_i$, $P_k$ refers properties (e.g., vector) of a neighbor garment k, i is an index, k is an index, and $L_{meta}$ is a loss function.

In a number of embodiments, SA computes the inner product of the meta-data vectors to determine whether the example k is negative or positive where for a positive example the sign is retained as is and for a negative example the sign is inverted. An advantage of computing the inner product of the meta-data vectors is that this operation can pull the positive examples closer and push the negative examples further away. In several embodiments, hard negative mining locates garments that have different properties than the anchor garment, and we maximize the distance between the anchor garment and other garments that have different properties. In various embodiments, different properties identified in a pair of the images of garments can include a shirt and a pair of pants. In some embodiments, the SA generates the distance using the meta-data vectors or embeddings for each garment in the pair of garments by calculating a derivative with respect to weights, then modifies the weights so the embeddings of the different garments are farther away from each other. In several embodiments, a loss function can output a higher loss when different garments receive similar embeddings thus derivating the loss and changing the weights makes the embeddings of different garments go further away from each other. In various embodiments, SA mines $Nx_i$ at the end of each epoch (e.g., iteration) of the deep learning algorithm. As an example, deep learning can be trained on tens or hundreds of epochs viewing each example thousands of times where the deep learning algorithm can sometimes get stuck in running epochs using the same examples. In some embodiments, in some local minimums, the SA can utilize augmentations to create epochs that are different to avoid getting stuck in a deep learning algorithm. Such augmentations can include randomizing a transformation T each time an example is fed into the deep learning algorithm.

In several embodiments, activity 420 also can include performing active learning. In many embodiments, performing active learning can include submitting style proposals to individuals for feedback, wherein the style proposals each comprise the anchor garment and at least one of the similar garments as a group. In many embodiments, performing active learning can include receiving feedback from the individuals. In many embodiments, performing active learning can include using the style proposals that are rejected as negative examples in a feedback loop.

Figure 11:
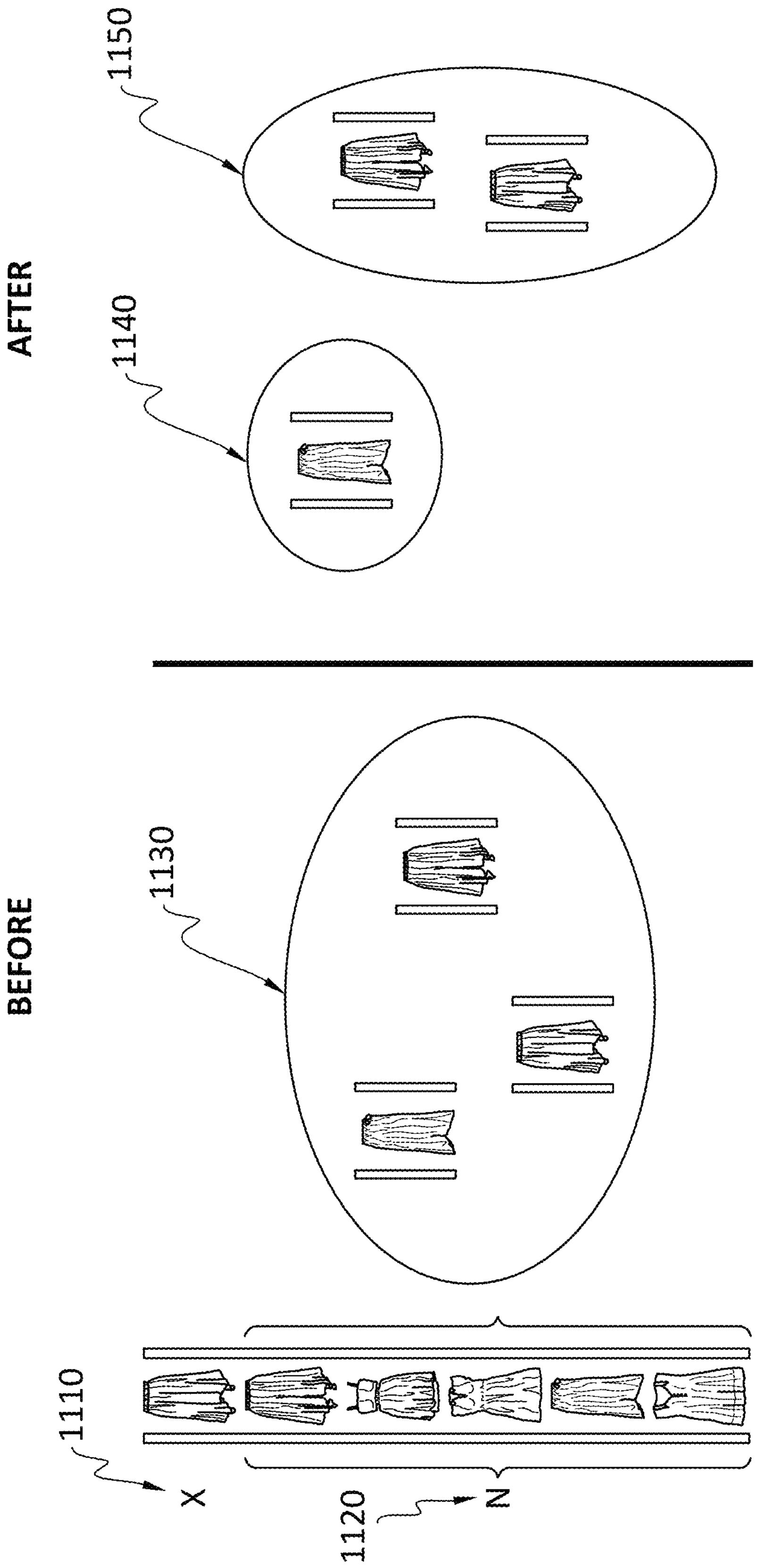
FIG. 11 illustrates an example of using fashion experts to provide feedback for training the styling agent.

For example, in various embodiments, active learning can include imitation learning where the SA learns to mimic the selections or style preferences of an individual with styling expertise. For example, turning ahead in the drawings, FIG. 11 illustrates an example of using fashion experts to provide feedback for training the styling agent. SA can be trained to imitate a stylist by sending images X and N to one or more of individuals, such as fashion experts, to elicit an opinion, such as a collective opinion, about which garments in images N are similar to the anchor garment in image X. Cluster 1130 is cluster 1050 shown in FIG. 10. The experts can evaluate cluster 1130 to determine similarity of the items within the cluster. Clusters 1140 and 1150 show an example of output from the expert opinion, in which cluster 1140 includes a rejected image (not similar enough) and image 1150 includes the anchor image and an image that is determined to be similar enough. This expert feedback can be fed back into the deep learning model.

In some embodiments, performing active learning can include capturing a fashion preference or taste by incorporating the tagging of opinions of individuals other than the user, such as fashion experts. In several embodiments, after deep learning is completed outputting complementary garments for selection, for each garment, g the top-K similar garments, $K=\{k_i\}$, can be located. In various embodiments, active learning can include sending this output results of deep learning to a number of individuals, such as fashion experts, where the individuals submit a tag for each garment in K if it is similar to g or not, where a similar garment receives the label 1, dissimilar receives −1, and then deep learning can be repeated for the remaining images based on the opinions of the individuals. In some embodiments, the label (e.g., sign) can be determined by a majority vote of the individuals (e.g., experts).

Figure 15:
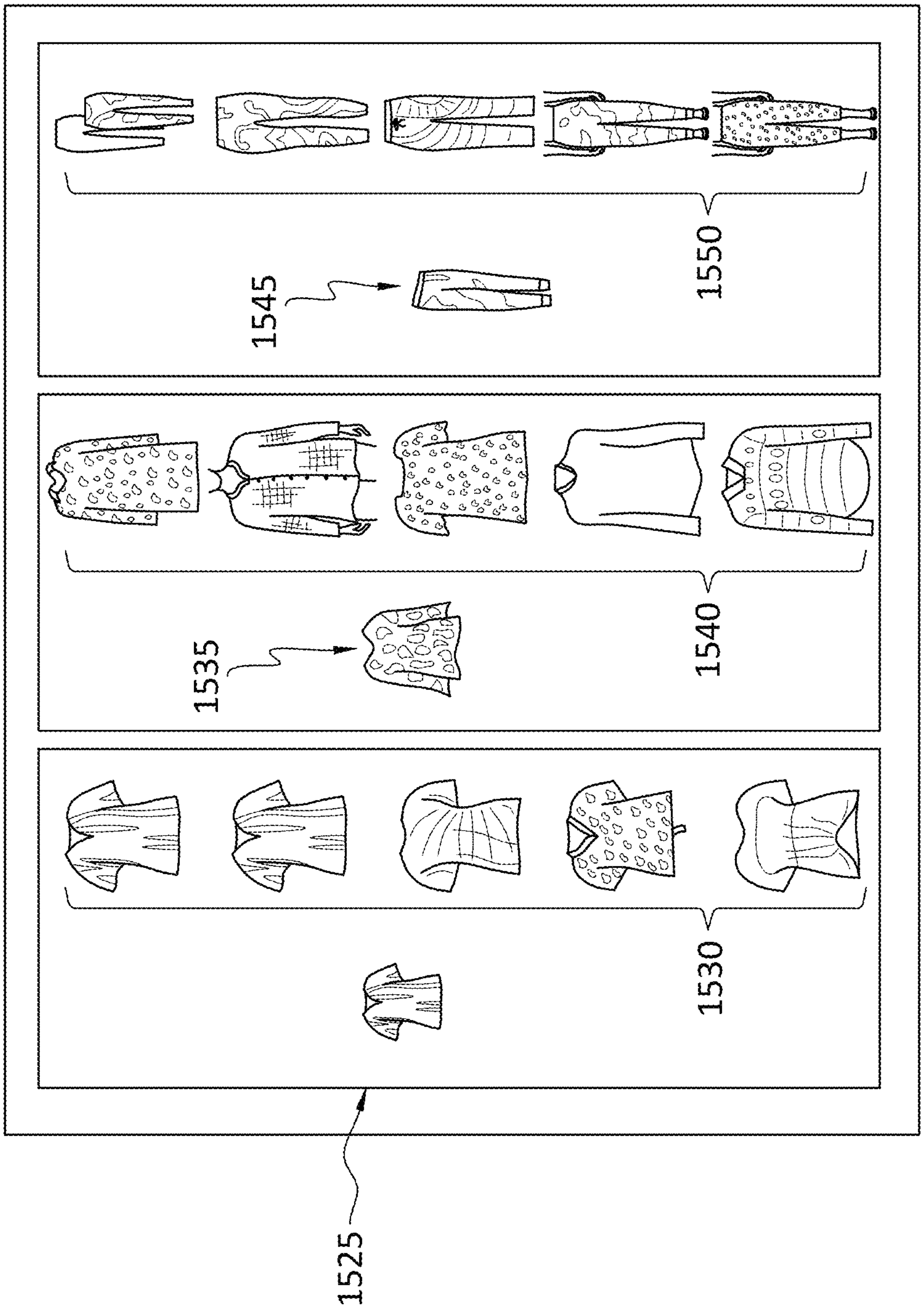
FIG. 15 illustrates examples of qualitative results of a top-5 list of complementary garments output by the visual search model.

Turning ahead in the drawings, FIG. 15 illustrates examples of qualitative results of a top-5 list of similar garments output by the visual search model. Images 1525, 1535, and 1545 are each an image of a complementary garment input into the visual search, and sets 1530, 1540, and 1550, respectively, are set of similar images output from the visual search model.

Returning to FIG. 4, in various embodiments, method 400 additionally can include an activity 425 of displaying, on a user interface, an avatar wearing the anchor garment and at least one of the similar garments. In many embodiments, displaying the avatar wearing the anchor garment and more than one complementary garment can be viewed in real-time.

Figure 12:
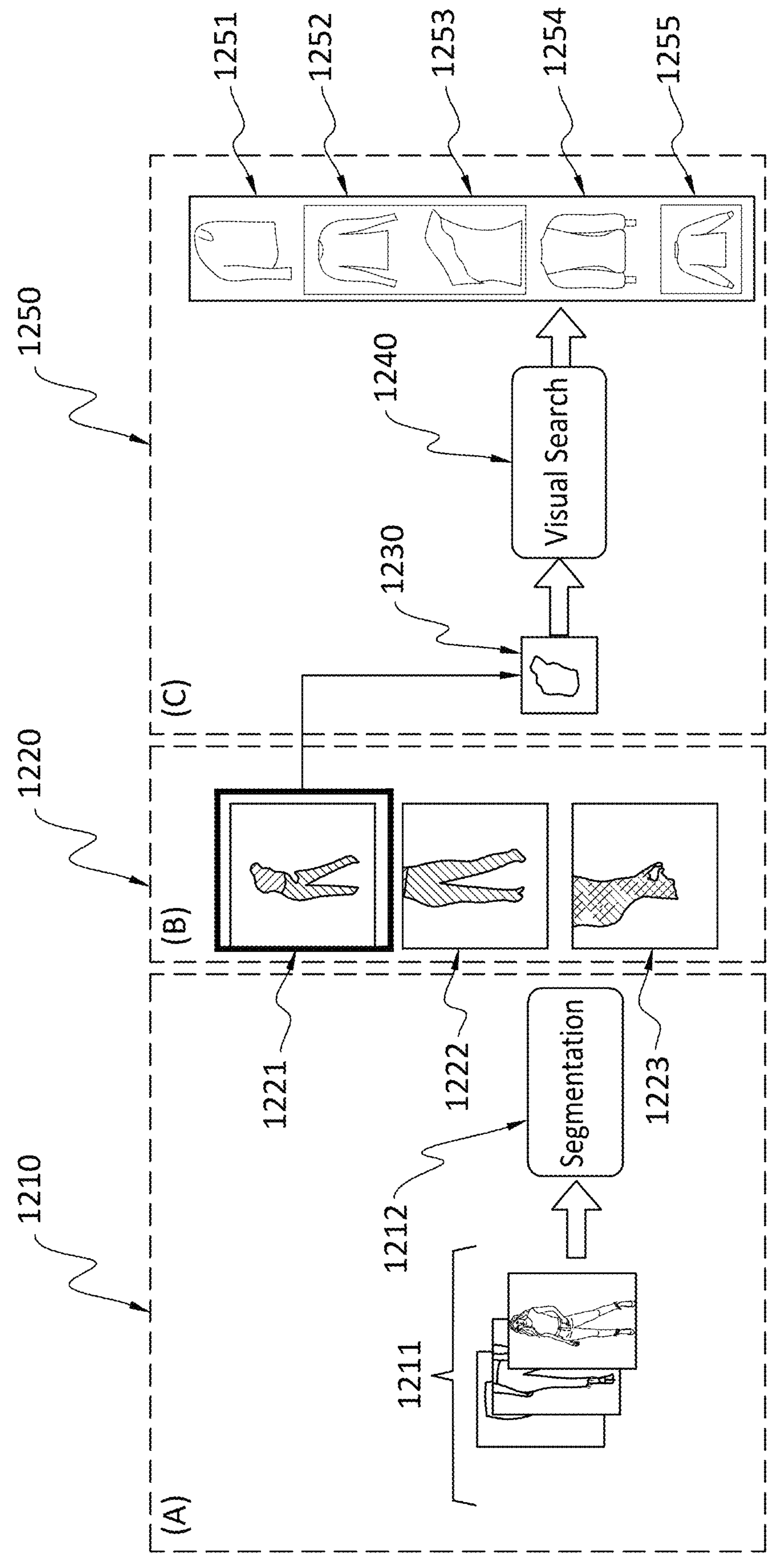
FIG. 12 illustrates an example implementation of the process of the method of FIG. 4, including the determining a group of candidate complementary garments, selecting a best image of a complementary garment, and searching for similar garments.

Jumping ahead in the drawings, FIG. 12 illustrates an example implementation of the process of method 400 (FIG. 4), including the determining a group of candidate complementary garments, selecting a best image of a complementary garment, and searching for similar garments. For example, in box 1210, stock images from the vendor 1211 are input into segmentation model 1212, which outputs images 1220 (e.g., images 1221-1223) that identify mask areas of complementary garments. Image 1221 is selected as the best image of a complementary garment. The mark of the complementary garment in image 1221 is used to isolate the complementary garment, as shown in image 1230, which is used as input into visual search 1240 to find images 1250 of garments in the item catalog that are similar to the complementary garment shown in image 1230. For example, images 1251, 1252, 1253, 1254, and 1255 are similar garments, which can be displayed on the avatar along with the anchor item.

Returning to FIG. 3, in many embodiments, communication system 311 can at least partially perform activity 405 (FIG. 4) of receiving stock images comprising an anchor garment; and/or activity 425 (FIG. 4) of displaying, on a user interface, an avatar wearing the anchor garment and at least one of the similar garments.

In some embodiments, identification system 312 can at least partially perform activity 410 (FIG. 4) of automatically identifying the anchor garment and complementary garments within the stock images.

In several embodiments, selecting system 313 can at least partially perform activity 415 (FIG. 4) of selecting an image of the stock images in which a mask area of a first complementary garment of the complementary garments as a ratio of an area of the anchor garment is largest over other complementary garments of the complementary garments and/or activity 1220 (FIG. 12) of selecting the best image based on a mask area ratio.

In various embodiments, searching system 314 can at least partially perform activity 1250 (FIG. 12) of conducting a visualization search of a catalog to output a group of candidate images of complementary garments for review by imitation learning.

In some embodiments, segmenting system 315 can at least partially perform activity 410 (FIG. 4) can include using a segmentation model to identify the anchor garment and the complementary garments within the stock images; and/or activity 1210 (FIG. 12) of implementing the segmentation model.

In many embodiments, visualization system 316 can at least partially perform activity 420 (FIG. 4) of performing an image search, using the image, in an item catalog for similar garments to the first complementary garment.

In various embodiments, filtering system 317 can at least partially perform activity 820 (FIG. 8) to match images 830 that are complementary to image 810 from the vendor catalog.

In some embodiments, training system 318 can at least partially perform activity 420 further can include pre-training the visual search model by augmenting batch images for training the visual search model with positive examples or negative examples In many embodiments, augmenting system 319 can at least partially perform activity 420 (FIG. 4) of augmenting batch images can include generating new images to be the positive examples, based on the stock images that comprise the first complementary garment.

In several embodiments, web server 320 can include a webpage system 321. Webpage system 321 can at least partially perform sending instructions to user computers (e.g., 350-351 (FIG. 3)) based on information received from communication system 311.

In many embodiments, the techniques described herein can be used continuously at a scale that cannot be handled using manual techniques. For example, the number of daily and/or monthly visits to the content source can exceed approximately ten million and/or other suitable numbers, the number of registered users to the content source can exceed approximately one million and/or other suitable numbers, and/or the number of products and/or items sold on the website can exceed approximately ten million (10,000,000) approximately each day.

In a number of embodiments, the techniques described herein can solve a technical problem that arises only within the realm of computer networks, as displaying an avatar modeling an anchor garment with a complementary garment using virtual try-on technology does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because a content catalog, such as an online catalog, that can power and/or feed an online website that is part of the techniques described herein would not exist.

Various embodiments can include a system. A system can include one or more processors and one or more non-transitory computer-readable media storing computing instructions, that when executed on the one or more processors, cause the one or more processors to perform certain acts. The acts can include receiving stock images comprising an anchor garment. The acts also can include automatically identifying the anchor garment and complementary garments within the stock images. The acts further can include selecting an image of the stock images in which a mask area of a first complementary garment of the complementary garments as a ratio of an area of the anchor garment is largest over other complementary garments of the complementary garments. The acts additionally can include performing an image search, using the image, in an item catalog for similar garments to the first complementary garment. The acts also can include displaying, on a user interface, an avatar wearing the anchor garment and at least one of the similar garments.

A number of embodiments can include a method. A method being implemented via execution of computing instructions configured to run on one or more processors and stored at one or more non-transitory media. The method can include receiving stock images comprising an anchor garment. The method also can include automatically identifying the anchor garment and complementary garments within the stock images. The method further can include selecting an image of the stock images in which a mask area of a first complementary garment of the complementary garments as a ratio of an area of the anchor garment is largest over other complementary garments of the complementary garments. The method additionally can include performing an image search, using the image, in an item catalog for similar garments to the first complementary garment. The method also can include displaying, on a user interface, an avatar wearing the anchor garment and at least one of the similar garments being implemented via execution of computing instructions configured to run at one or more processors and stored at one or more non-transitory computer-readable media.

Although generating an avatar modeling an anchor garment with a complementary garment has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-15 may be modified, and that the foregoing description of certain of these embodiments does not necessarily represent a complete description of all possible embodiments. For example, one or more of the procedures, processes, or activities of FIGS. 3-15 may include different procedures, processes, and/or activities and be performed by many different modules, in many different orders, and/or one or more of the procedures, processes, or activities of FIGS. 3-15 may include one or more of the procedures, processes, or activities of another different one of FIGS. 3-15. As another example, the systems within styling model system 311, identification system 312, selecting system 313, searching system 314, segmenting system 315, visualization system 316, filtering system 317, training system 318, and/or augmenting system 319, can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions, that when executed on the one or more processors, cause the one or more processors to perform:

receiving stock images comprising an anchor garment;

automatically identifying the anchor garment and complementary garments within the stock images;

selecting an image of the stock images in which a mask area of a first complementary garment of the complementary garments as a ratio of an area of the anchor garment is largest over other complementary garments of the complementary garments, wherein the mask area comprises a pixel-level segmentation mask area generated by a semantic or instance segmentation model;

performing an image search, using the image, in an item catalog for similar garments to the first complementary garment; and displaying, on a user interface, an avatar wearing the anchor garment and at least one of the similar garments.

2. The system of claim 1, wherein automatically identifying the anchor garment and the complementary garments comprises:

using a segmentation model to identify the anchor garment and the complementary garments within the stock images.

3. The system of claim 2, wherein automatically identifying the anchor garment and the complementary garments comprises:

identifying the anchor garment based on which garment is most commonly found in the stock images.

4. The system of claim 1, wherein selecting the image comprises:

filtering out the stock images in which the complementary garments are partially cropped out.

5. The system of claim 1, wherein performing the image search further comprises:

pre-training a visual search model;

performing deep clustering on the visual search model, as pre-trained, to mine k-nearest neighbors, with hard negative mining based on garment metadata; and performing active learning.

6. The system of claim 5, wherein pre-training the visual search model further comprises:

augmenting batch images for training the visual search model with positive examples or negative examples.

7. The system of claim 6, wherein augmenting the batch images comprises:

generating new images to be the positive examples, based on the stock images that comprise the first complementary garment, by at least one of:

changing hues of the first complementary garment;

changing an angle of or skewing the first complementary garment;

changing a size of the first complementary garment;

adding holes in the stock images of the first complementary garment; or changing an avatar model wearing the first complementary garment using a virtual try on (VTO) model.

8. The system of claim 6, wherein augmenting the batch images further comprises:

automatically selecting the negative examples from images of other garments in the item catalog.

9. The system of claim 6, wherein augmenting the batch images further comprises:

generating new images to be the negative examples, based on the stock images that comprise the first complementary garment, by changing a color of the first complementary garment.

10. The system of claim 5, wherein performing the active learning comprises:

submitting style proposals to individuals for feedback, wherein the style proposals each comprise the anchor garment and at least one of the similar garments as a group;

receiving feedback from the individuals; and using the style proposals that are rejected as negative examples in a feedback loop.

11. A method being implemented via execution of computing instructions configured to run on one or more processors and stored at one or more non-transitory media, the method comprising:

receiving stock images comprising an anchor garment;

automatically identifying the anchor garment and complementary garments within the stock images;

selecting an image of the stock images in which a mask area of a first complementary garment of the complementary garments as a ratio of an area of the anchor garment is largest over other complementary garments of the complementary garments, wherein the mask area comprises a pixel-level segmentation mask area generated by a semantic or instance segmentation model;

performing an image search, using the image, in an item catalog for similar garments to the first complementary garment; and displaying, on a user interface, an avatar wearing the anchor garment and at least one of the similar garments.

12. The method of claim 11, wherein automatically identifying the anchor garment and the complementary garments comprises:

using a segmentation model to identify the anchor garment and the complementary garments within the stock images.

13. The method of claim 12, wherein automatically identifying the anchor garment and the complementary garments comprises:

identifying the anchor garment based on which garment is most commonly found in the stock images.

14. The method of claim 11, wherein selecting the image comprises:

filtering out the stock images in which the complementary garments are partially cropped out.

15. The method of claim 11, wherein performing the image search further comprises:

pre-training a visual search model;

performing deep clustering on the visual search model, as pre-trained, to mine k-nearest neighbors, with hard negative mining based on garment metadata; and performing active learning.

16. The method of claim 15, wherein pre-training the visual search model further comprises:

augmenting batch images for training the visual search model with positive examples or negative examples.

17. The method of claim 16, wherein augmenting the batch images comprises:

generating new images to be the positive examples, based on the stock images that comprise the first complementary garment, by at least one of:

changing hues of the first complementary garment;

changing an angle of or skewing the first complementary garment;

changing a size of the first complementary garment;

adding holes in the stock images of the first complementary garment; or changing an avatar model wearing the first complementary garment using a virtual try on (VTO) model.

18. The method of claim 16, wherein augmenting the batch images further comprises:

automatically selecting the negative examples from images of other garments in the item catalog.

19. The method of claim 16, wherein augmenting the batch images further comprises:

generating new images to be the negative examples, based on the stock images that comprise the first complementary garment, by changing a color of the first complementary garment.

20. The method of claim 15, wherein performing the active learning comprises:

submitting style proposals to individuals for feedback, wherein the style proposals each comprise the anchor garment and at least one of the similar garments as a group;

receiving feedback from the individuals; and using the style proposals that are rejected as negative examples in a feedback loop.

* * * * *